April 18, 1944.  M. O. SEARLE  2,347,003
APPARATUS FOR APPLYING INSULATING TUBING
ON WIRE CABLES, CONDUITS, AND THE LIKE
Original Filed May 2, 1942  2 Sheets-Sheet 1
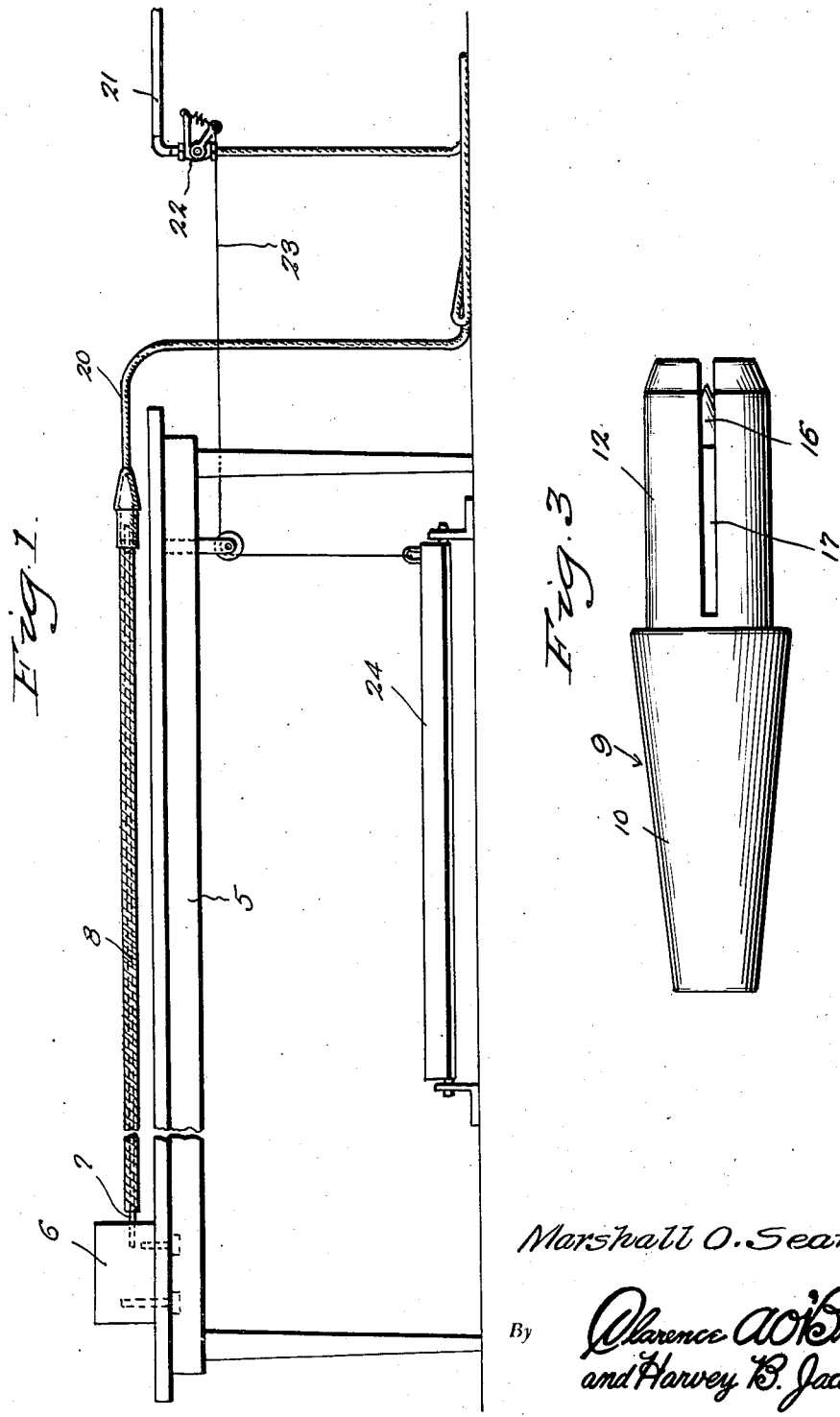
Inventor
Marshall O. Searle
By Clarence A. O'Brien
and Harvey B. Jacobson
Attorneys April 18, 1944.   M. O. SEARLE   2,347,003
APPARATUS FOR APPLYING INSULATING TUBING
ON WIRE CABLES, CONDUITS, AND THE LIKE
Original Filed May 2, 1942   2 Sheets-Sheet 2
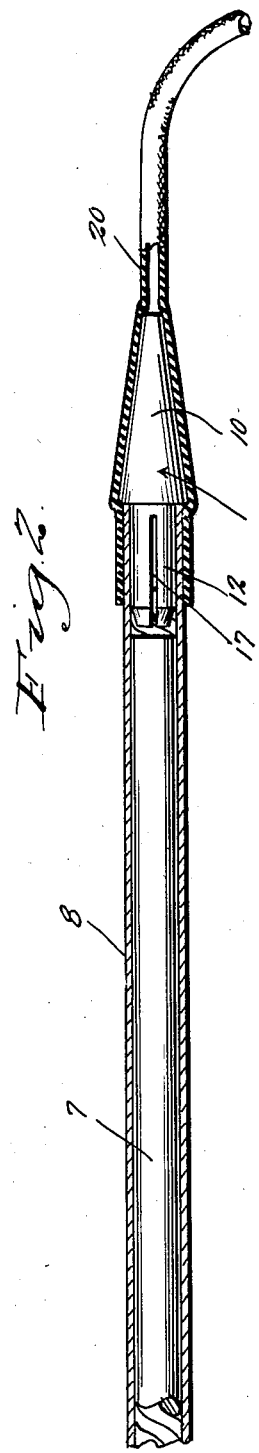
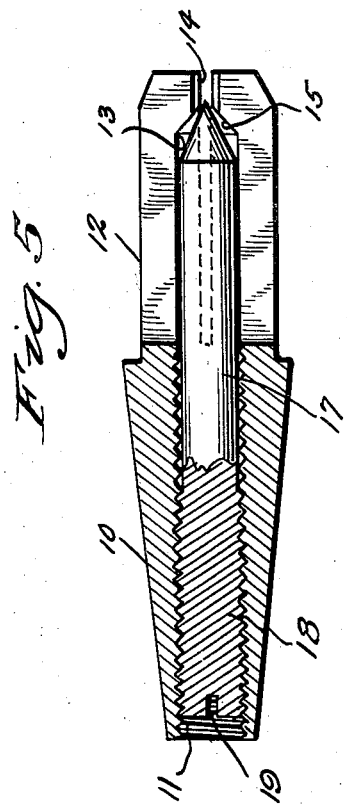
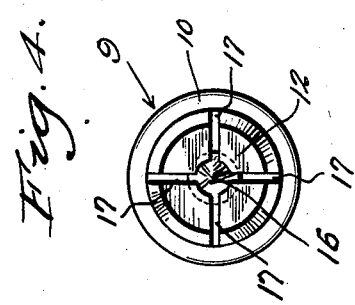
Inventor
Marshall O. Searle
By Clarence A. O'Brien
and Harvey B. Jacobson
Attorneys Patented Apr. 18, 1944

2,347,003

UNITED STATES PATENT OFFICE 2,347,003

APPARATUS FOR APPLYING INSULATING TUBING ON WIRE CABLES, CONDUITS, AND THE LIKE

Marshall O. Searle, Beverly Hills, Calif.

Original application May 2, 1942, Serial No. 441,492. Divided and this application March 2, 1943, Serial No. 477,756

2 Claims. (Cl. 29—88.2)

This is a divisional application of my copending application, Serial No. 441,492, filed May 2, 1942.

The present invention relates broadly to the application of rubber tubing over flexible or rigid conduits, wire cables, or other electric or fluid carriers and more particularly to the application of insulating tubing over flexible metal conduits as used in aircraft wiring systems.

An important object of the present invention is to provide fittings for the cable or conduit adapted for guiding the rubber tubing over the cable or conduit when such tubing is expanded by air pressure.

A further object is to provide means for expanding the rubber tubing in order to facilitate the placing of the tubing over the conduit or cable, as the case may be.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a front elevational view of a work bench for supporting the flexible conduits in a horizontal position while applying the insulation sleeve thereto.

Figure 2 is a fragmentary longitudinal sectional view of the conduit supporting rod.

Figure 3 is a side elevational view of the expansible fitting for attaching the inside of a hollow flexible conduit for guiding the insulating sleeve thereon.

Figure 4 is an end elevational view thereof, and

Figure 5 is a longitudinal sectional view of the fitting.

Referring now to the drawings in detail, the numeral 5 designates a work bench on which is attached a block 6. A supporting rod 7 has one end secured to the block and extends horizontally therefrom in spaced relation above the bench.

The flexible metal conduit or cable is shown at 8 and is sleeved on the rod 7.

A fitting 9 is shown in detail in Figures 3 to 5 inclusive for attaching the inside of the conduit and comprises a tapered head 10 having a threaded bore 11 extending therethrough, the large end of the head terminating in a longitudinally split stem 12 also having a bore 13 extending therethrough communicating with the bore 11 of the head.

The bore 13 adjacent its outer end is reduced as shown at 14 and includes a tapered portion 15 adapted for engagement by the tapering end 16 of an expanding pin 17 having a threaded rear end 18 for threading through the bore 11 of the head, whereby to expand the stem 12 into frictional engagement with the inner wall of the flexible metal conduit 8 when inserted therein as shown in Figure 2.

The outer end of the expanding pin 17 is formed with a kerf 19 for receiving a screw driver or similar tool to adjust the pin longitudinally in the head.

From the foregoing it will be apparent that the fitting constitutes a guide for feeding the flexible conduit or other electric or fluid carrier through a rubber insulating tubing 20 so that the tubing will provide a cover for the conduit.

The tubing may be constructed of natural or synthetic rubber.

The tubing extends to an air supply pipe 21 having a valve 22 therein which is controlled by a cable 23 from a foot treadle 24 adjacent the work bench, pressure of air entering the tubing expanding the same sufficiently to easily slide the tubing over the fitting and onto the conduit.

It is believed the details of construction, manner of use and advantages of the devices will be readily understood from the foregoing without further detailed explanation.

Having thus described the invention what I claim is:

1. A guide tip for feeding a conduit through a tubular covering for the conduit, said guide tip comprising a tapering body, a longitudinally split stem on one end of the body, and means carried by the body for expanding the stem into frictional engagement with the internal walls of one end of the conduit.

2. A guide tip for feeding a conduit through a tubular covering for the conduit, said guide tip comprising a tapering body, a longitudinally split stem on one end of the body, and a screw operable in the body for expanding the stem into frictional engagement with the internal walls of one end of the conduit.

MARSHALL O. SEARLE.